United States Patent
Kim et al.

(10) Patent No.: US 10,448,218 B2
(45) Date of Patent: Oct. 15, 2019

(54) METHOD AND APPARATUS FOR STOPPING AND RESTARTING MBMS SERVICE

(71) Applicant: LG Electronics Inc., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 15/524,507

(22) PCT Filed: Nov. 6, 2015

(86) PCT No.: PCT/KR2015/011909
§ 371 (c)(1),
(2) Date: May 4, 2017

(87) PCT Pub. No.: WO2016/072792
PCT Pub. Date: May 12, 2016

(65) Prior Publication Data
US 2017/0339531 A1 Nov. 23, 2017

Related U.S. Application Data

(60) Provisional application No. 62/077,175, filed on Nov. 7, 2014.

(51) Int. Cl.
*H04W 4/06* (2009.01)
*H04W 72/12* (2009.01)
(Continued)

(52) U.S. Cl.
CPC ............. *H04W 4/06* (2013.01); *H04W 72/12* (2013.01); *H04W 76/40* (2018.02); *H04W 28/0247* (2013.01)

(58) Field of Classification Search
CPC ........ H04W 4/06; H04W 72/12; H04W 28/02
(Continued)

(56) References Cited

U.S. PATENT DOCUMENTS

2011/0070905 A1* 3/2011 Kazmi ............... H04W 72/005
455/507
2011/0249608 A1* 10/2011 Fischer ............... H04W 72/005
370/312
(Continued)

FOREIGN PATENT DOCUMENTS

| CN | 102695129 A | * | 9/2012 | ............ H04W 24/08 |
| CN | 102958000 A | * | 3/2013 | ............ H04W 48/16 |
| WO | 2012010028 | | 1/2012 | |

OTHER PUBLICATIONS

Alcatel-Lucent et al., "Solution descriptions following discussions at RAN3#85bis," R3-142528, 3GPP TSG RAN WG3 Meeting #85bis, Oct. 10, 2014, see p. 2.
(Continued)

*Primary Examiner* — Omar J Ghowrwal
*Assistant Examiner* — Kokou R Detse
(74) *Attorney, Agent, or Firm* — Dentons US LLP

(57) ABSTRACT

Provided are a method and an apparatus for stopping and restarting an MBMS service in a wireless communication system. A terminal receives multicast channel (MCH) scheduling information (MSI) and checks whether a special value is included in the received MSI. If the special value is included in the MSI, then whether to stop or suspend the MBMS service can be determined. That is, MSI can be considered in stopping the MBMS service. Furthermore, stopping is terminating an MBMS service without a consideration for restarting same, and suspending is terminating an MBMS service with a consideration for restarting same.

16 Claims, 14 Drawing Sheets

(51) Int. Cl.
*H04W 76/40* (2018.01)
*H04W 28/02* (2009.01)

(58) Field of Classification Search
USPC .......................................... 370/312
See application file for complete search history.

(56) References Cited

U.S. PATENT DOCUMENTS

| 2013/0215761 | A1  | 8/2013  | Xu et al. |         |
|--------------|-----|---------|-----------|---------|
| 2014/0071878 | A1  | 3/2014  | Xu et al. |         |
| 2014/0286222 | A1* | 9/2014  | Yu .......................... | H04W 4/08 |
|              |     |         |           | 370/312 |
| 2016/0211980 | A1* | 7/2016  | Zhu ........................ | H04W 4/06 |
| 2017/0318560 | A1* | 11/2017 | Xu ......................... | H04W 4/06 |

OTHER PUBLICATIONS

3GPP TS 36.321 V12.3.0. "3GPP; TSG RAN; E-UTRA; MAC protocol specification (Release 12)," Sep. 23, 2014, see p. 42.
3GPP TS 36.321 V12.5.0. "3GPP; TSG RAN; E-UTRA; MAC protocol specification (Release 12)," Mar. 2015.

* cited by examiner

METHOD AND APPARATUS FOR STOPPING AND RESTARTING MBMS SERVICE

CROSS-REFERENCE TO RELATED APPLICATIONS

This application is the National Stage filing under 35 U.S.C. 371 of International Application No. PCT/KR2015/011909, filed on Nov. 6, 2015, which claims the benefit of U.S. Provisional Application No. 62/077,175 filed on Nov. 7, 2014, the contents of which are all hereby incorporated by reference herein in their entirety.

BACKGROUND OF THE INVENTION

Field of the invention

The present invention relates to mobile communication, and more particularly, to a method and apparatus for stopping and restarting a multimedia broadcast/multicast service (MBMS) service.

Related Art

Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

SUMMARY OF THE INVENTION

The present invention proposes a method and apparatus for stopping a multimedia broadcast/multicast service (MBMS) service. In addition, the present invention proposes a method and apparatus for restarting the stopped MBMS service.

A terminal may receive multicast channel (MCH) scheduling information (MSI), and may check whether a special value is included in the received MSI. If the special value is included, the MBMS service may be stopped.

If the MBMS service is stopped, the terminal may release an MRB and establish a unicast bearer. In this case, monitoring of the MSI, an MTCH, or an MCCH is not performed.

If the MBMS service is suspended, the terminal may establish the unicast bearer without having to release the MRB. In this case, if the monitoring of the MSI or the MTCH is continuously performed and thus any one of them is monitored, the suspended MBMS service may be restarted through the MRB.

According to one embodiment, there is provided a method of stopping and restarting a multimedia broadcast/multicast service (MBMS) service in a wireless communication system. A user equipment (UE) may receive multicast channel scheduling information (MSI), check whether a special value is included in the received MSI, and determine a stop or suspension of the MBMS service if the special value is included in the MSI. However, the stop of the MBMS service is a stop of the MBMS service not considering resumption of the MBMS service, and the suspension of the MBMS service is a suspension of the MBMS service considering resumption of the MBMS service.

If the MBMS service stop is determined, releasing an MRB (a radio bearer for an MBMS) by the UE may be further included. Stopping monitoring of the MSI, an MTCH, or an MCCH by the UE may be further included. If the UE is in an RRC_IDLE state, stopping prioritizing of an MBMS frequency of interest may be further included. Establishing a unicast bearer by the UE may be further included. Indicating that there is no interest in an MBMSInterestIndication message by the UE may be further included.

If the MBMS service suspension is determined, maintaining the MRB (the radio bearer for the MBMS) by the UE may be further included. Continuously performing monitoring of the MSI, the MTCH, or the MCCH by the UE may be further included. If at least any one of the MSI or the MTCH is monitored, restarting the suspended MBMS service through the MRB may be further included. Continuously performing prioritizing of an MBMS frequency of interest by the UE may be further included. Establishing a unicast bearer by the UE may be further included.

According to another embodiment, there is provided a UE for stopping and restarting an MBMS service in a wireless communication system. The UE may include: a memory; a transceiver; and a processor operatively coupled to the memory and the transceiver. The processor may be configured for: allowing the transceiver to receive MSI; checking whether a special value is included in the received MSI; and determining an MBMS service stop or an MBMS service suspension if the special value is included in the received MSI. However, the MBMS service stop is a stop of the MBMS service not considering resumption of the MBMS service, and the MBMS service suspension is a suspension of the MBMS service considering resumption of the MBMS service.

The processor may be configured for releasing an MRB (a radio bearer for an MBMS) if the MBMS service stop is determined.

The processor may be configured for maintaining the MRB (the radio bearer for the MBMS) if the MBMS service suspension is determined. The processor may be configured for continuously performing monitoring of the MSI, an MTCH, or an MCCH. The processor may be configured for restarting the suspended MBMS service through the MRB if at least any one of the MSI or the MTCH is monitored.

According to the present invention, a time required for a terminal to recognize a stop of a multimedia broadcast/multicast service (MBMS) service.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi™), IEEE 802.16 (WiMAX™), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
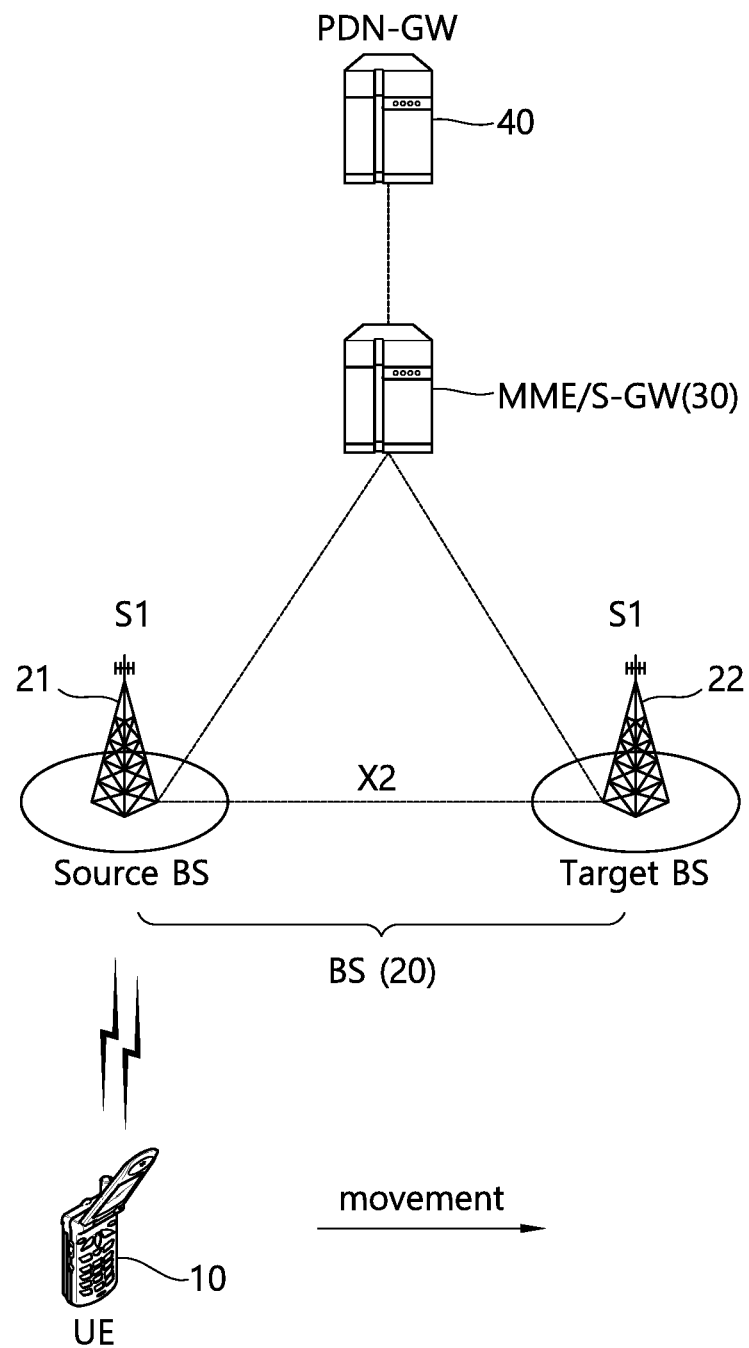
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

Referring to FIG. 1, the E-UTRAN includes at least one base station (BS) 20 that provides a user equipment (UE) with a control plane and a user plane. The UE 10 may be stationary or mobile, and may be referred to by other terms, such as an MS (Mobile Station), an AMS (Advanced MS), a UT (User Terminal), an SS (Subscriber Station), or a wireless device.

The base station 20 generally refers to a station that communicates with the UE 10, and may be referred to by other terms such as an eNodeB (Evolved-NodeB), a BTS (Base Transceiver System), an access point, a femto-eNB, a pico-eNB, a home eNB, or a relay. The base station 20 may provide at least one cell to the UE. The cell may mean a geographical area to in which a communication service is offered or a specific frequency band. The cell may mean a downlink frequency resource and an uplink frequency resource. Or, the cell may mean a combination of a downlink frequency resource and an optional uplink frequency resource. Further, in general case carrier aggregation (CA) is not considered, one cell has a pair of uplink and downlink frequency resources.

An interface for transmission of user traffic or control traffic may be used between base stations 20. The source base station (BS) 21 refers to a base station having a radio bearer currently established with the UE 10, and the target base station (BS) 22 refers to a base station to which the UE 10 is to hand over, disconnecting the radio bearer with the source base station 21.

The base stations 20 may be linked to each other via an X2 interface that is used for exchanging messages between the base stations 20. The base station 20 is linked through an S1 interface to an EPS (Evolved Packet System), more specifically, a mobility management entity (hereinafter, MME)/S-GW (Serving Gateway, 30). The S1 interface supports a many-to-many relation between the base station 20 and the MME/S-GW 30. In order to provide a packet data service to the MME/S-GW 30, a PDN-GW 40 is used. The PDN-GW 40 varies depending on the purpose or service of communication, and a PDN-GW 40 for supporting a specific service can be discovered using APN (Access Point Name) information.

The inter E-UTRAN handover is a basic handover mechanism used for handover between E-UTRAN access networks and consists of X2-based handover and S1-based handover. The X2-based handover is used when the UE hands over from the source BS 21 to the target BS 22 using an X2 interface, and at this time, the MME/S-GW 30 is not changed. By the S1-based handover, the first bearer that has been established between the P-GW 40, MME/S-GW 30, source BS 21, and UE 10 is released, and a new second bearer is established between the P-GW 40, MME/S-GW 30, target BS 22, and UE 10.

Figure 2:
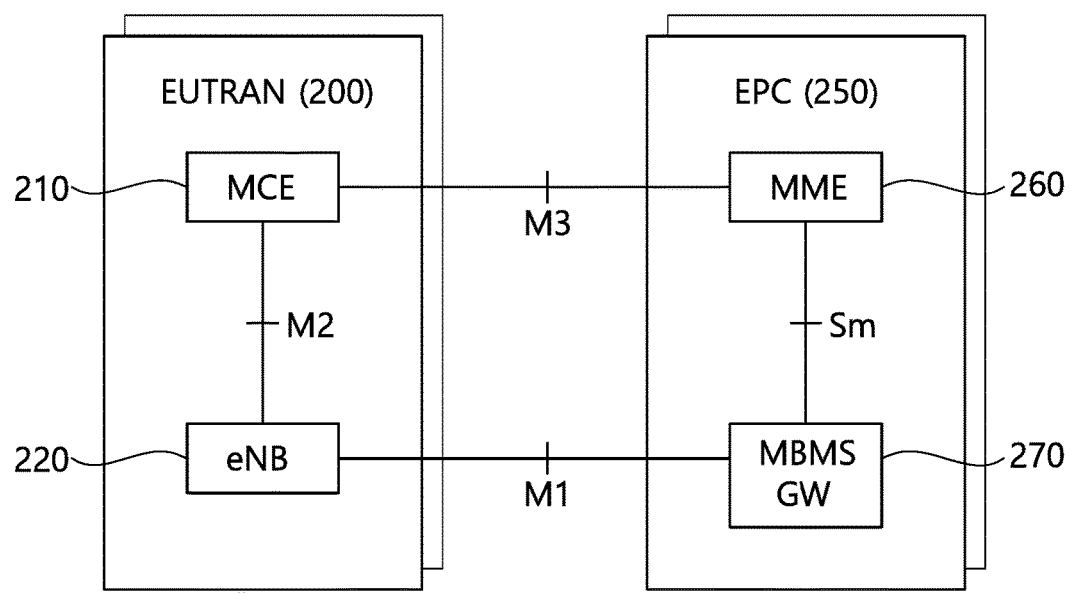
FIG. 2 shows a network architecture of an MBMS to which the present invention applies.

FIG. 2 shows a network architecture of an MBMS to which the present invention applies.

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MME 260 performs such operations as NAS signaling, roaming, authentication, selection of a PDN gateway and the S-GW, MME selection for handover by an MME change, accessibility to an idle mode UE, or AS security control.

The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
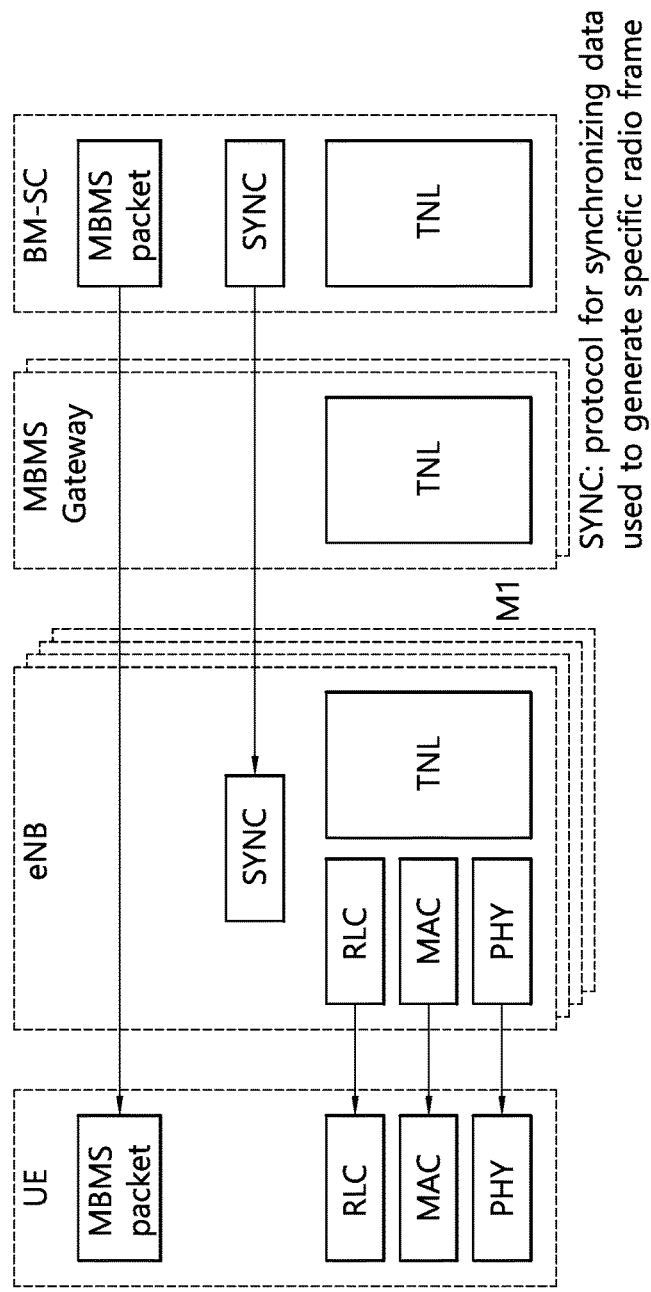
FIG. 3 is a user plane structure for supporting an MBMS.
Figure 4:
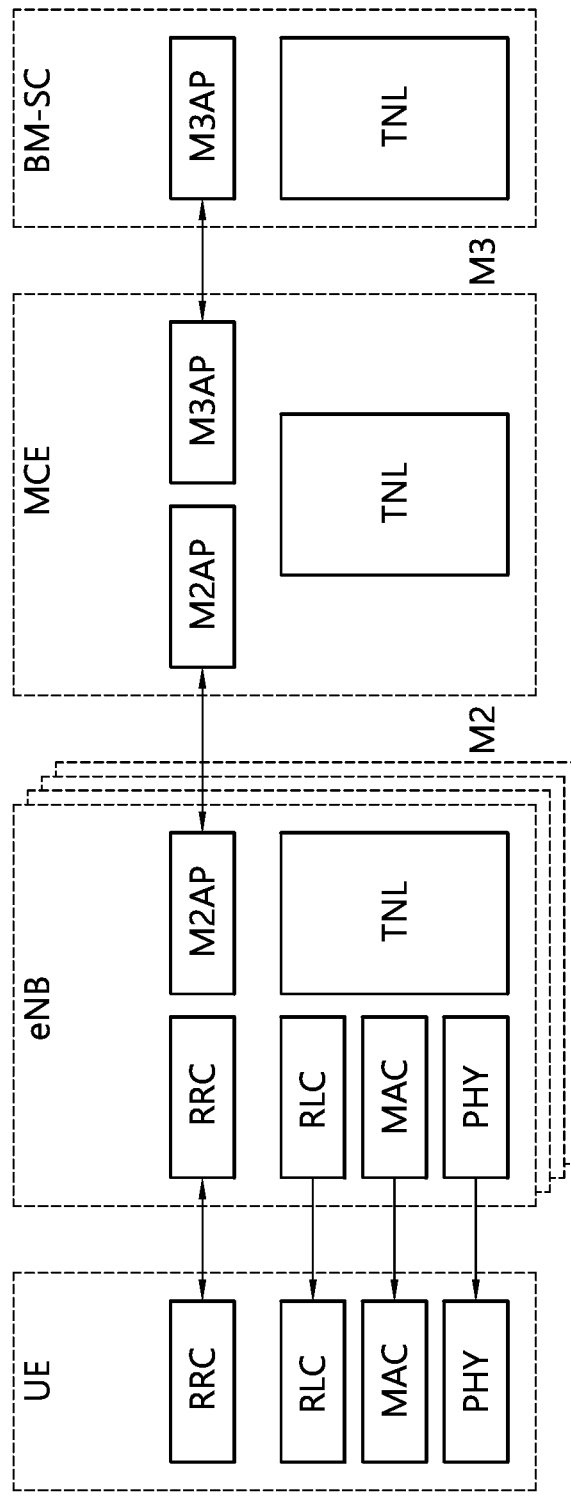
FIG. 4 is a control plane structure for supporting an MBMS.

FIG. 3 is a user plane structure for supporting an MBMS, and FIG. 4 is a control plane structure for supporting an MBMS.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a MIB (Master Information Block) and a plurality of SIBs (System Information Blocks).

The MIB may include a limited number of parameters which are most frequently transmitted and are required for acquisition for other information from a cell. The terminal firstly searches the MIB after downlink synchronization. The MIB may include information such as a downlink channel bandwidth, PHICH configuration, an SFN to support synchronization and to be operated as a timing reference, and eNB transmission antenna configuration. The MIB may be broadcasted on the BCH.

A SIB1 (SystemInformationBlockType1) among SIBs is transmitted while being included in a SystemInformationBlockType1", and other SIBs except for the SIB1 is transmitted while being included in the system information message. The SIBs may be flexibly mapped to the system information message according to a scheduling information list parameter included in the SIB1. However, each SIB is included in a single system information message, and only SIBs having the same scheduling required value (e.g. period) may be mapped to the same system information message. Further, a SIB2 (SystemInformationBlockType2) is mapped to a system information message corresponding to a first entry in a system information message list of a scheduling information list. A plurality of system information messages may be transmitted within the same time period. The SIB1 and all system information messages are transmitted on a DL-SCH.

Further to broadcast transmission, the E-UTRAN may be dedicated-signaled in a state that the SIB1 includes the same parameter as a preconfiguration value. In this case, the SIB1 may be transmitted while being included in a RRC connection reconfiguration message.

The SIB1 includes information on terminal cell access, and defines scheduling of other SIBs. The SIB1 may include PLMN identifiers of a network, a TAC (Tracking Area Code), a cell ID, a cell barring status to indicate whether a cell may camp-on, the lowest reception level required in a cell used as a cell reselection reference, and information on a transmission time and a time period of other SIBs.

The SIB2 may include radio resource configuration information common in all terminals. The SIB2 may include a uplink carrier frequency, an uplink channel bandwidth, RACH configuration, paging configuration, uplink power control configuration, sounding reference signal configuration, PUCCH configuration and PUSCH configuration supporting ACK/NACK transmission.

The terminal may apply acquisition and change sensing procedures of system information with respect to only a PCell. In the SCell, the E-UTRAN may provide all system information on the RRC connection state operation through dedicated signaling when a corresponding SCell is added. When system information on the configured SCell is changed, the E-UTRAN may release a considered SCell and may add the considered SCell later, which may be performed together with a single RRC connection reconfiguration message. The E-UTRAN may configure parameter values different from a value broadcasted in the considered SCell through the dedicated signaling.

The terminal should ensure validity with respect to system information of a specific type. The above system information refers to required system information. The required system information may be defined as follows.

When the terminal is in a RRC idle state: the terminal should to have a valid version of an MIB and the SIB1 as well as a SIB2 to a SIB8, which may depend on support of a considered RAT.

When the terminal is in a RRC connection state: the terminal should ensure to have valid versions of the MIB, the SIB1 and the SIB2.

In general, after the system information is acquired, validity may be ensured with a maximum three hours.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 5:
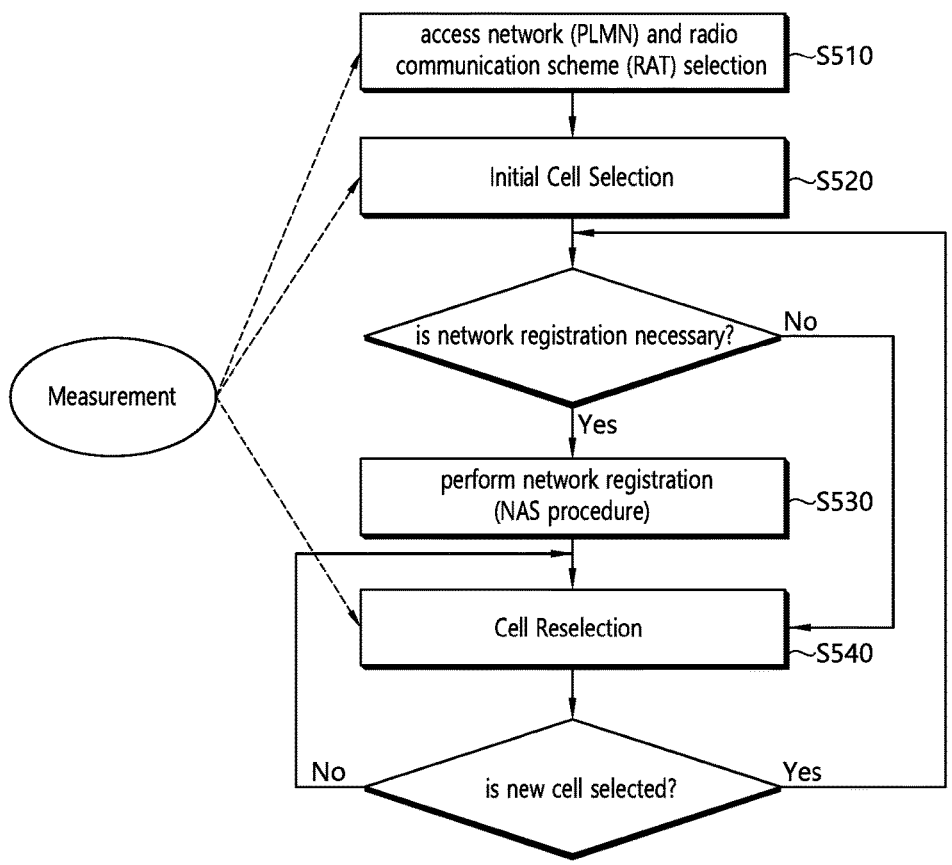
FIG. 5 shows the operation of UE in the RRC idle state.

FIG. 5 shows the operation of UE in the RRC idle state. FIG. 5 shows a procedure in which UE that is initially powered on experiences a cell selection process, registers it with a network, and then performs cell reselection if necessary.

Referring to FIG. 5, the UE selects Radio Access Technology (RAT) in which the UE communicates with a Public Land Mobile Network (PLMN), that is, a network from which the UE is provided with service (S510). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S520). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S530). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S540). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 6:
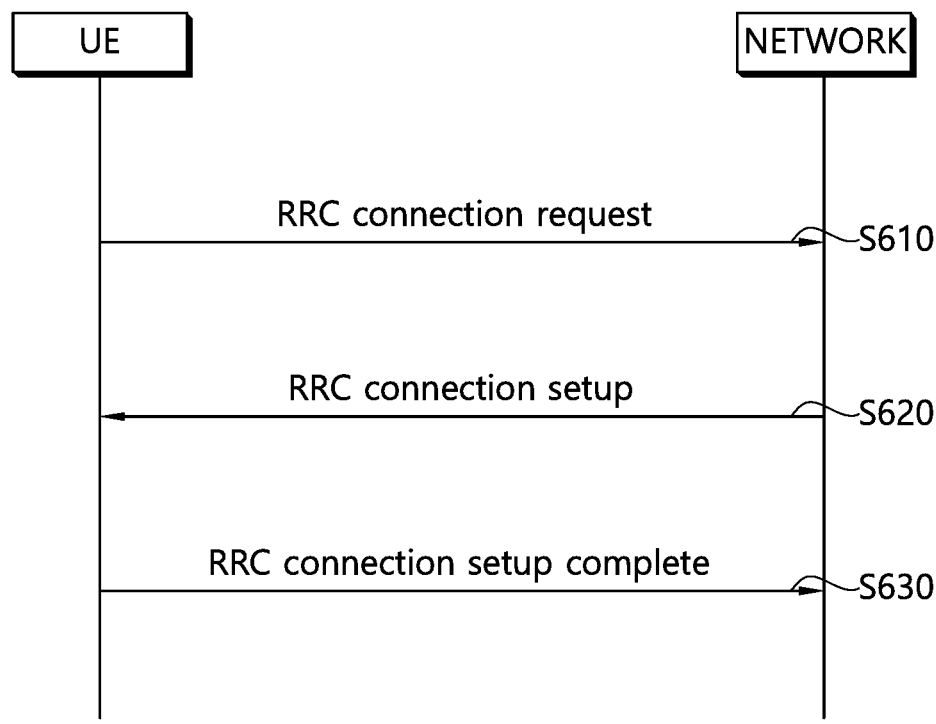
FIG. 6 shows a process of establishing RRC connection.

FIG. 6 shows a process of establishing RRC connection.

A UE transmits to a network an RRC connection request message for requesting an RRC connection (step S610). In this case, the UE may be in an RRC_IDLE state. In addition, when the RRC connection request message is transmitted to the network, the UE may restart a timer. In this case, the timer may be T300 of 3GPP TS 36.311. The network transmits an RRC connection setup message in response to the RRC connection request (step S620). After receiving the RRC connection setup message, the UE enters an RRC_CONNECTED mode. In this case, the UE may stop the timer restarted in step S610. The UE transmits to the network an RRC connection setup complete message used to check for successful completion of the RRC connection establishment (step S630).

Figure 7:
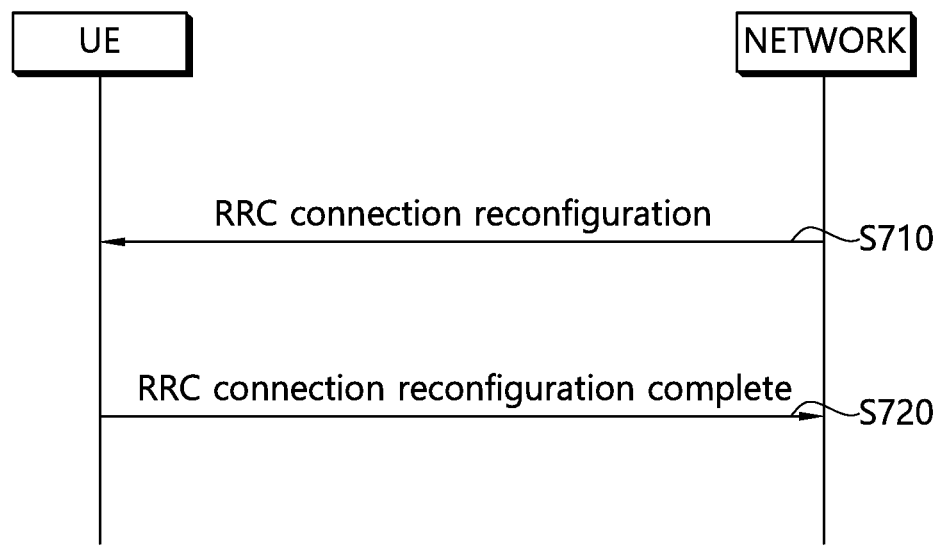
FIG. 7 shows an RRC connection reconfiguration process.

FIG. 7 shows an RRC connection reconfiguration process.

An RRC connection reconfiguration is used to modify RRC connection. This is used to establish/modify/release RBs, perform handover, and set up/modify/release measurements. A network sends an RRC connection reconfiguration message for modifying RRC connection to UE (S710). As a response to the RRC connection reconfiguration message, the UE sends an RRC connection reconfiguration complete message used to check the successful completion of the RRC connection reconfiguration to the network (S720).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN. Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell. A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, \quad R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell. In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 8:
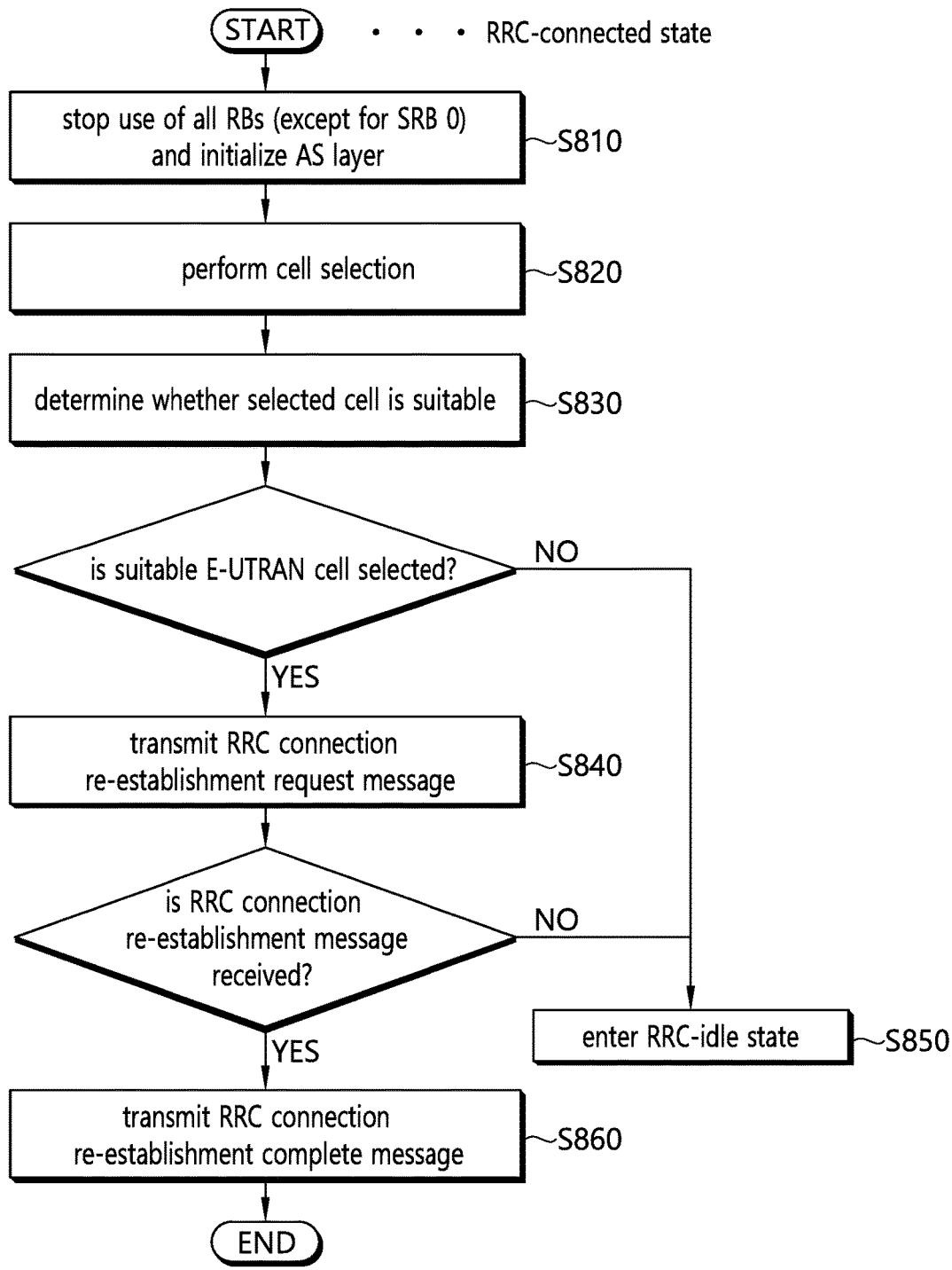
FIG. 8 shows an RRC connection re-establishment procedure.

FIG. 8 shows an RRC connection re-establishment procedure.

Referring to FIG. 8, UE stops using all the radio bearers that have been configured other than a Signaling Radio Bearer (SRB) #0, and initializes a variety of kinds of sublayers of an Access Stratum (AS) (S810). Furthermore, the UE configures each sublayer and the PHY layer as a default configuration. In this process, the UE maintains the RRC connection state.

The UE performs a cell selection procedure for performing an RRC connection reconfiguration procedure (S820). The cell selection procedure of the RRC connection re-establishment procedure may be performed in the same manner as the cell selection procedure that is performed by the UE in the RRC idle state, although the UE maintains the RRC connection state. After performing the cell selection procedure, the UE determines whether or not a corresponding cell is a suitable cell by checking the system information of the corresponding cell (S830). If the selected cell is determined to be a suitable E-UTRAN cell, the UE sends an RRC connection re-establishment request message to the corresponding cell (S840). Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S850).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE. The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S860). In contrast, if the RRC connection re-establishment request message is received from the UE and the request is not accepted, the cell sends an RRC connection re-establishment reject message to the UE. If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, an MBMS and a multicast/broadcast single frequency network (MBSFN) are described in detail.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns a highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned a highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

In the RRC_IDLE state, the UE may operate as follows. 1) UE-specific DRX may be set by an upper layer. 2) The UE monitors a paging channel to detect a call, a system information change, and an ETWS notification and performs adjacent cell measurement and cell selection (reselection). The UE may acquire system information and may perform possible measurement.

In the RRC_CONNECTED state, the UE may transmit unicast data and may set UE-specific DRX in a lower layer. The UE supporting CA may use one or more secondary cells along with a primary cell.

The UE monitors the paging channel and monitors the content of system information block (SIB) type 1 to detect a system information change. To determine whether data is scheduled for the UE, the UE monitors control channels associated with a shared data channel. Further, the UE provides channel quality and feedback information. The UE may measure a neighboring cell, may report a measurement result, and acquires system information.

Figure 9:
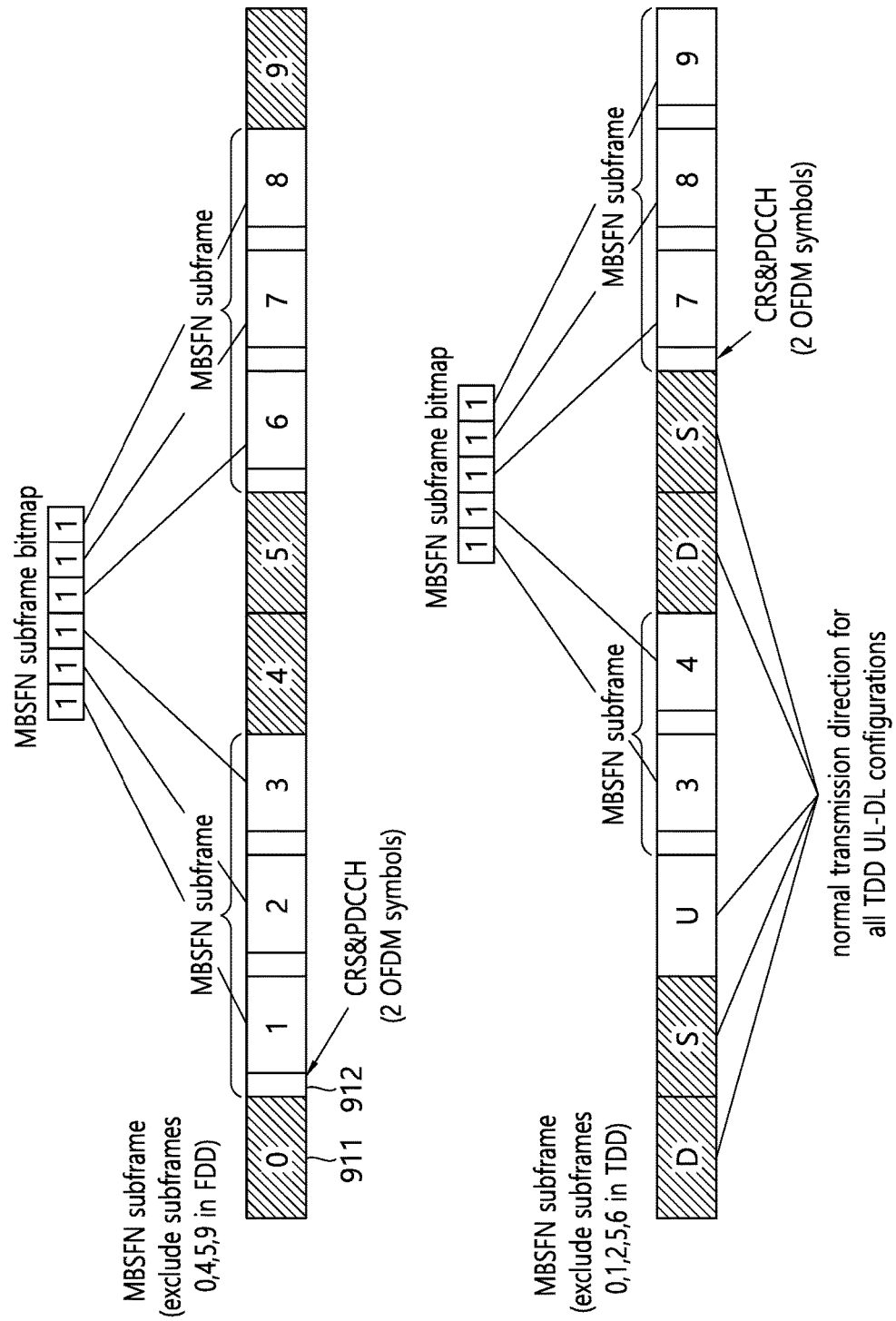
FIG. 9 shows a structure of an MBSFN subframe.

FIG. 9 shows a structure of an MBSFN subframe.

Referring to FIG. 9, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 911 uses a normal CP, a CRS according to the normal CP is also used in the first two OFDM symbols 912 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 10:
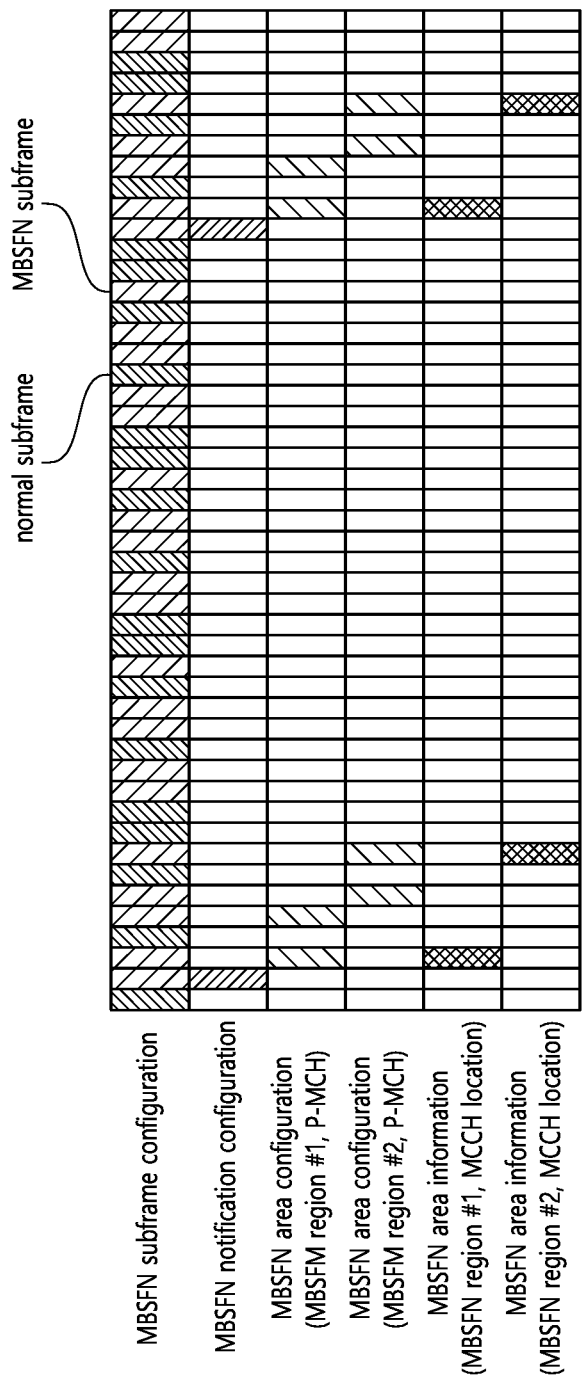
FIG. 10 shows an example of an MBSFN subframe configuration for performing an MBMS service.

FIG. 10 shows an example of an MBSFN subframe configuration for performing an MBMS service.

Referring to FIG. 10, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MBSFN region, the MBSFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Figure 11:
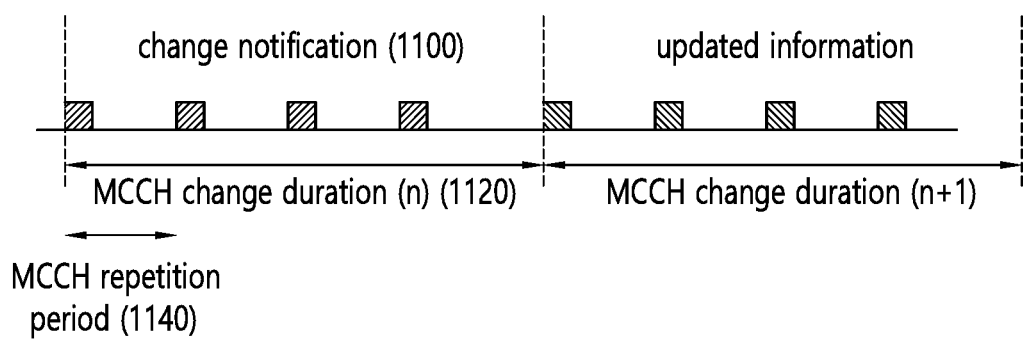
FIG. 11 shows a method of notifying a change in MCCH information to a UE when MCCH information is changed.

FIG. 11 shows a method of notifying a change in MCCH information to a UE when MCCH information is changed.

Referring to FIG. 11, the change in the MCCH information may occur only in a specific radio frame. The same MCCH information may be transmitted several times with an MCCH repetition period 1140 in an MCCH change duration 1120. In a PDCCH, an indication of an MBMS specific RNTI (M-RNTI) may be used to inform the change in MCCH information to a UE in an RRC_IDLE state and a UE in an RRC_CONNECTED state. In the PDCCH, an MCCH information change notification 1100 may be periodically transmitted, and may be transmitted in an MBSFN subframe. An MBMS-enabled RRC_IDLE UE or RRC_CONNECTED UE may acquire MCCH information.

Hereinafter, a method of instructing an MBMS service stop through an MCCH and a problem thereof will be described.

At present, a UE may recognize that an MBMS service is stopped by a temporary mobile group identity (TMGI) through the MCCH. That is, if the TMGI is not recognized, it may be known that the MBMS is stopped. However, at present, a method of recognizing the MBMS service stop by using the TMGI may require a long time to inform the UE of the MBMS service stop, which may cause the service stop during the time. If a network determines to stop and restart the MBMS service, the network transmits an MCCH change notification and updates MCCH information, and thereafter the UE recognizes the MBMS service stop or start. As described in FIG. 11, this is because, when the MCCH information is changed, a specific period must be elapsed in order for the UE to update this. A method of recognizing whether the MBMS service is stopped or restarted through the MCCH is useful in a sense that it does not have an additional effect on an RAN2 specification, but it may cause a stop of a service during a specific time. Therefore, new signaling may be used to recognize whether the MBMS service is stopped or restarted. The new signaling may be a special value of MSI.

This will be described in detail with reference to 3GPP TS 36.321 V12.5.0(2015-03).

Figure 12:
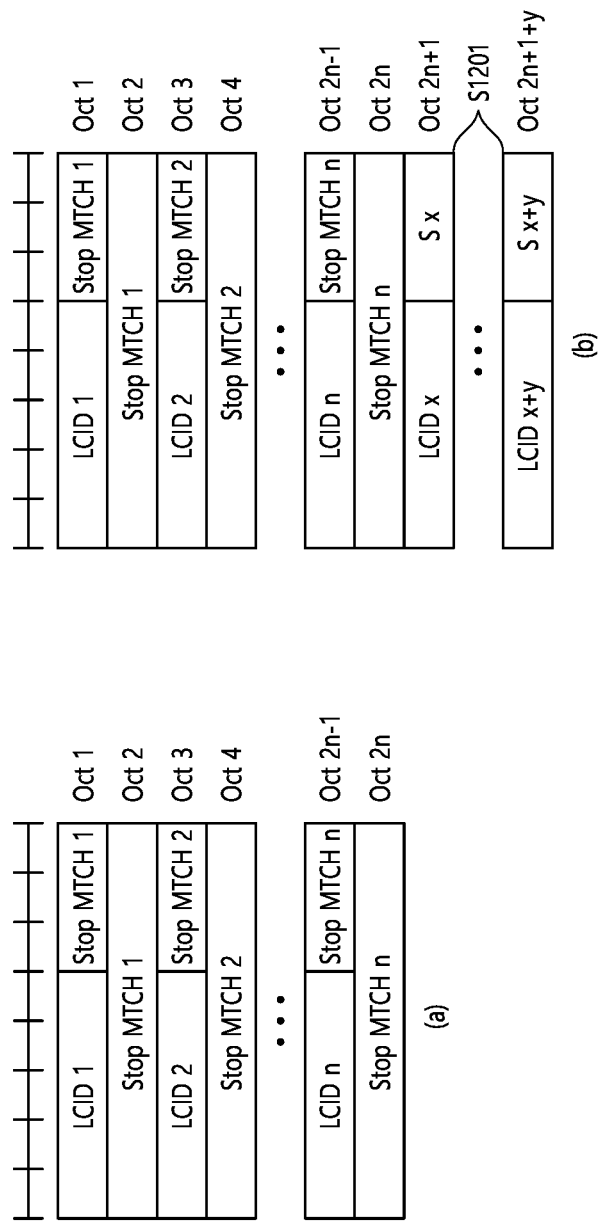
FIG. 12 shows extended MSI.

FIG. 12 shows extended MSI.

FIG. 12-(*a*) shows the existing MCH scheduling information (MSI), and FIG. 12-(*b*) shows extended MCH. Referring to FIG. 12-(*b*), it can be known that an S field S1201 is newly defined in comparison with the MSI of FIG. 12-(*a*). In 3GPP TS 36.321 V12.5.0(2015-03), the S field is defined as a field indicating that transmission of a corresponding MTCH will be stopped. In the present invention, the S field may be called as a special value of the MSI.

Considering the S field which is the new signaling, a UE may recognize that the special value is included in the MSI and thus may stop an MBMS service. That is, when a network corresponding to an MBMS bearer is stopped, the UE may rapidly request the network to establish a unicast bearer, and thus a gap between the stop of the MBMS bearer and the start of the unicast bearer may be more decreased in comparison with a case of using a TMGU through the MCCH. However, since it is not apparent that whether the stop of the MBMS service by using the special value of the MSI implies a stop or a suspension, an operation of a UE for stopping and restarting the MBMS service by using the special value of the MSI will be described below in detail.

Hereinafter, the stop is defined that the MBMS service is stopped and the MRB is released, thereby not considering whether the MBMS service will be restarted at a later time, whereas the suspension is defined that the MBMS service is stopped, but the MRB is not released in consideration of a case where the MBMS service will be restarted at a later time.

First, a method of instructing an MBMS service stop by using MSI is proposed according to an embodiment of the present invention. That is, a UE considers a special value of the MSI only for the MBMS service stop, and does not consider whether to restart the MBMS service at a later time.

The UE may receive the MSI from the network. If the special value of the MSI is included in the received MSI, the UE may stop the MBMS service. Therefore, the UE does not need to receive a corresponding MSI/MTCH (and, possibly, the corresponding MCCH), and releases a corresponding MRB. On the other hand, the UE establishes a corresponding unicast bearer. If the MBMS service is provided by the unicast bearer, the UE will not need to monitor a current MSI/MTCH/MCCH for the MBMS service stop.

If UEs in an RRC_IDLE state stop the MBMS service by receiving the special value of the MSI and do not consider whether to restart the MBMS at a later time, there is no need to prioritize an MBMS frequency of interest. If UEs in an RRC_CONNECTED state stop the MBMS service by receiving the special value of the MSI and do not consider whether to restart the MBMS service at a later time, the UEs need to indicate that there is no interest in the MBMSInterestIndication message. The above-described proposal that the UE stops the MBMS service by using the MSI is a new UE operation in comparison with an old UE operation not considering the MSI for service continuity.

Next, a method of instructing a suspension of an MBMS service by using MSI is proposed according to another embodiment of the present invention. That is, a UE may consider a special value of the MSI for the suspension of the MBMS service and for a restart of the MBMS service at a later time.

The UE may receive the MSI from the network. If the special value of the MSI is included in the received MSI, the UE may suspend the MBMS service. In this case, since the network can restart MTCH transmission of an MBMS service even after the special value of the MSI is received, the UE needs to continuously monitor transmission after the reception of the MSI. That is, even during a time when a corresponding unicast bearer is established, the UE must continuously perform an MBMS procedure without having to release the MRB. The UE may continuously perform monitoring of the MSI, an MTCH, or an MCCH, and may restart the MBMS service through the MRB if the MSI, the MTCH, or the MCCH is monitored at a later time. For this, even if a unicast bearer is established after the special value of the MSI is received, the UE must be on an MBMS frequency and continuously prioritize a priority of an MBMS frequency of interest.

Figure 13:
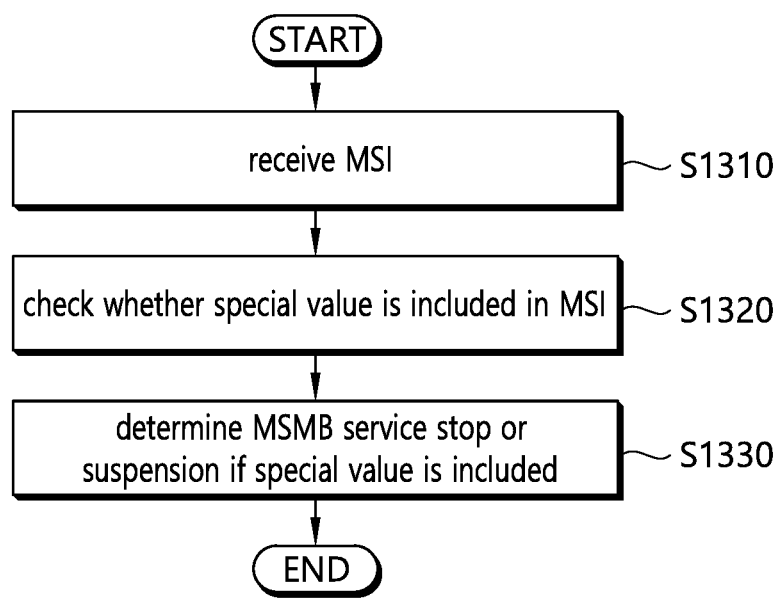
FIG. 13 is a block diagram showing a case of considering a special value of MSI when an MBMS service is stopped or suspended according to an embodiment of the present invention.

FIG. 13 is a block diagram showing a case of considering a special value of MSI when an MBMS service is stopped or suspended according to an embodiment of the present invention.

A UE may receive multicast channel scheduling information (MSI) from a network (S1310). The UE may check whether a special value is included in the received MSI (S1320). If the special value is included, the UE may determine whether to stop or suspend the MBMS service by considering this in the stop of the MBMS service (S1330). The stop may be an MBMS service stop not considering a restart thereof, and the suspension may be an MBMS service stop considering the restart thereof.

If the stop is the stop of the MBMS service not considering the restart thereof, the UE may release an MRB (a radio bearer for an MBMS). The UE may stop monitoring of the MSI, an MTCH, or an MCCH. If the UE is in an RRC_IDLE state, it may stop prioritizing an MBMS frequency of interest, and if the UE establishes a unicast bearer and transitions to an RRC_CONNECTED state, it may indicate that there is no interest in an MBMSInterestIndication message.

If the stop is the suspension considering the restart of the MBSM service, the UE may not release but maintain the MRB. The UE may continuously monitor the MSI, the MTCH, or the MCCH. When at least any one of the MSI, the MTCH, and the MCCH is monitored, the UE may restart the suspended MBMS service through the MRB. For this, the UE may continuously prioritize an MBMS frequency of interest. The MRB may not be released even if the UE establishes a unicast bearer.

Figure 14:
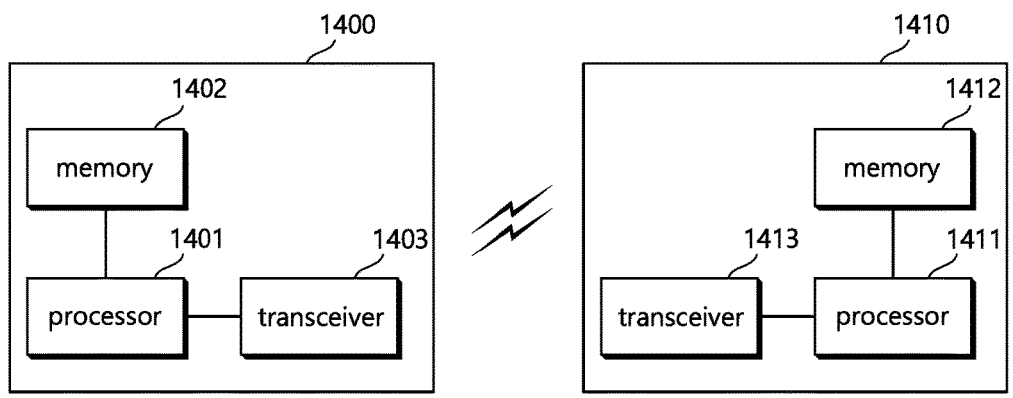
FIG. 14 is a block diagram illustrating a wireless communication system according to the embodiment of the present invention.

FIG. 14 is a block diagram illustrating a wireless communication system according to the embodiment of the present invention.

A BS 1400 includes a processor 1401, a memory 1402 and a transceiver 1403. The memory 1402 is connected to the processor 1401, and stores various information for driving the processor 1401. The transceiver 1403 is connected to the processor 1401, and transmits and/or receives radio signals. The processor 1401 implements proposed functions, processes and/or methods. In the above embodiment, an operation of the base station may be implemented by the processor 1401.

A UE 1410 includes a processor 1411, a memory 1412 and a transceiver 1413. The memory 1412 is connected to the processor 1411, and stores various information for driving the processor 1411. The transceiver 1413 is connected to the processor 1411, and transmits and/or receives radio signals. The processor 1411 implements proposed functions, processes and/or methods. In the above embodiment, an operation of the base station may be implemented by the processor 1411.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for communication related to a multimedia broadcast/multicast service (MBMS) service, the method performed by a user equipment (UE) and comprising:
receiving multicast channel scheduling information (MSI) including a special value;
determining either a MBMS service stop or a MBMS service suspension, based on the special value included in the received MSI;
based on that the MBMS service suspension is determined, maintaining an MRB which is a radio bearer for providing the MBMS service;
after the determining either the MBMS service stop or the MBMS service suspension, establishing a unicast bearer; and
monitoring the MSI, an MTCH, or an MCCH based on that the MBMS service suspension is determined,
wherein the monitoring is performed while the establishing the unicast bearer is being performed,
wherein based on that the MBMS service stop is determined, resumption of the MBMS service is not considered by the UE, and
wherein based on that the MBMS service suspension is determined, the resumption of the MBMS service is considered by the UE based on the maintaining of the MRB.

2. The method of claim 1, further comprising:
wherein based on that the MBMS service stop is determined, releasing, by the UE, the MRB which is the radio bearer for providing the MBMS service.

3. The method of claim 2, further comprising:
stopping, by the UE, monitoring of the MSI, the MTCH, or the MCCH, based on that the MBMS service stop is determined.

4. The method of claim 2, further comprising:
stopping prioritization of an MBMS frequency of interest, based on that the MBMS service stop is determined, wherein the UE is in an RRC_IDLE state.

5. The method of claim 2, further comprising:
informing, by the UE, that there is no interest in an MBMSInterestIndication message.

6. The method of claim 1, further comprising:
after the establishing the unicast bearer is being performed, monitoring the MSI, the MTCH, or the MCCH continuously, based on that the MBMS service suspension is determined.

7. The method of claim 6, further comprising:
restarting the suspended MBMS service through the MRB, based on that at least any one of the MSI or the MTCH is monitored, and based on that the MBMS service suspension is determined.

8. The method of claim 1, further comprising:
continuously performing, by the UE, prioritization of an MBMS frequency of interest, based on that the MBMS service suspension is determined.

9. A user equipment (UE) for communication related to a multimedia broadcast/multicast service (MBMS) service in a wireless communication system, the UE comprising:
a memory;
a transceiver; and
a processor, operatively coupled to the memory and the transceiver, wherein the processor is configured to:

control the transceiver to receive multicast channel scheduling information (MSI) including a special value;
determine either a MBMS service stop a MBMS service suspension, based on the special value included in the received MSI; and
based on that the MBMS service suspension is determined, maintaining an MRB which is a radio bearer for providing the MBMS service;
after the determining either the MBMS service stop or the MBMS service suspension, establish a unicast bearer; and
monitor the MSI, an MTCH, or an MCCH based on that the MBMS service suspension is determined,
wherein the monitoring is performed while the establishing the unicast bearer is being performed,
wherein based on that the MBMS service stop is determined, resumption of the MBMS service is not considered by the processor, and
wherein based on that the MBMS service suspension is determined, the resumption of the MBMS service is considered by the processor based on the maintaining of the MRB.

10. The UE of claim 9, wherein the processor is further configured to:
based on that the MBMS service stop is determined, release the MRB which is the radio bearer for providing the MBMS service.

11. The UE of claim 10, wherein the processor is further configured to:
stop monitoring of the MSI, the MTCH, or the MCCH, based on that the MBMS service stop is determined.

12. The UE of claim 10, wherein the processor is further configured to:
stop prioritization of an MBMS frequency of interest, based on that the MBMS service stop is determined,
wherein the UE is in an RRC_IDLE state.

13. The UE of claim 10, wherein the processor is further configured to:
inform that there is no interest in an MBMSInterestIndication message.

14. The UE of claim 9, wherein the processor is further configured to:
after the establishing the unicast bearer is being performed, monitor the MSI, the MTCH, or the MCCH continuously, when the MBMS service suspension is determined.

15. The UE of claim 14, wherein the processor is further configured to:
restart the suspended MBMS service through the MRB, based on that at least any one of the MSI or the MTCH is monitored, and based on that the MBMS service suspension is determined.

16. The UE of claim 9, wherein the processor is further configured to:
continuously perform prioritization of an MBMS frequency of interest, based on that the MBMS service suspension is determined.

* * * * *